H. IKE.
COMBINED HARROW AND PULVERIZER.
APPLICATION FILED SEPT. 5, 1918.
1,301,443.
Patented Apr. 22, 1919.
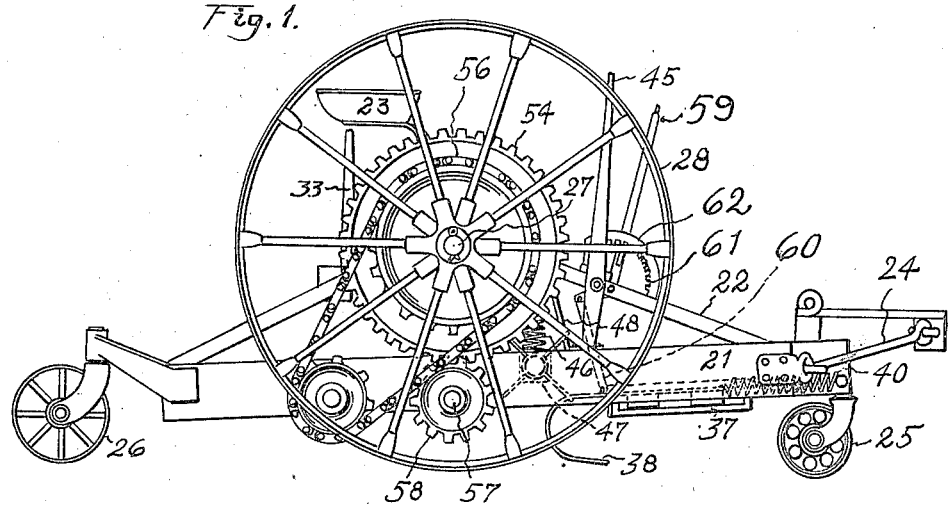
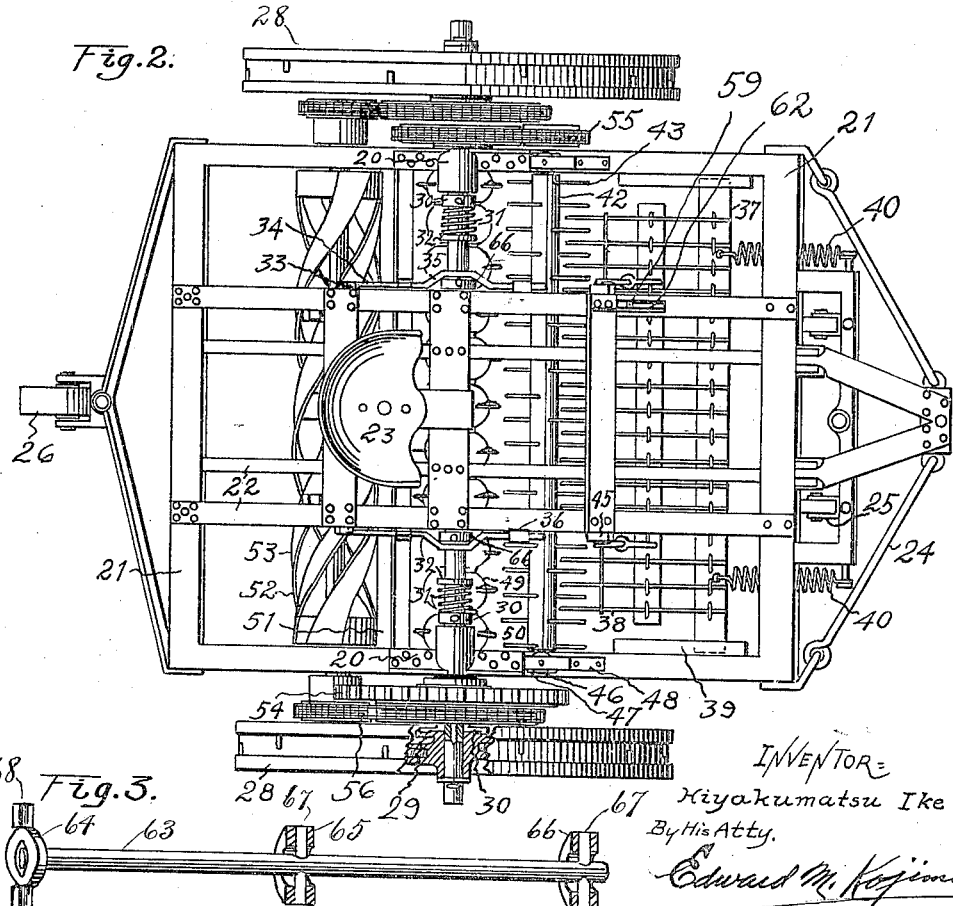
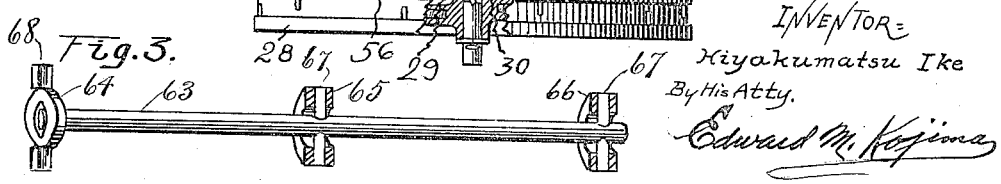

UNITED STATES PATENT OFFICE.

HIYAKUMATSU IKE, OF BUENA PARK, CALIFORNIA.

COMBINED HARROW AND PULVERIZER.

1,301,443.

Specification of Letters Patent.   Patented Apr. 22, 1919.

Application filed September 5, 1918.   Serial No. 252,673.

*To all whom it may concern:*

Be it known that I, HIYAKUMATSU IKE, a subject of the Emperor of Japan, residing at Buena Park, in the county of Orange and State of California, have invented a new and useful Combined Harrow and Pulverizer, of which the following is a specification.

This invention has relation to improvements in farm implements, and particularly to that class adapted for harrowing, cultivating, tilling, and leveling the soil, and otherwise preparing the same for the reception of the seed.

Heretofore, in the preparation of the soil preparatory to the planting of seed, a harrow is employed following the use of the plow. The plow leaves the soil in furrows, which soon harden and forms into lumps. Weeds which are not sufficiently covered by the turned soil are brought to the surface and deposited in more or less irregular heaps, which together with the hardened lumps of soil, provide a poor and imperfect seed bed. The hardened lumps of soil usually are not broken by the harrow teeth. The sowing of seed upon a poorly tilled and lumpy ground, results in a portion of the seed being left uncovered. The uncovered seed, which may average one-fifth of the amount sown, is lost. The plants which grow from the seed, when first appearing, are very small and easily broken or covered by cultivation when the ground is rough and poorly prepared before seeding.

In attempts to break and pulverize the soil with the harrow devices heretofore in use, the ground is subjected to repeated tilling with the harrow, and that portion of the soil repeatedly trodden upon by the horses, is compressed and left in a compacted condition by the harrow, which results in retarding the growth of the plants, resisting penetration by the tender plant roots and resisting absorption of moisture.

The object of the present invention is to provide means for overcoming these disadvantages incident to the use of the ordinary harrow and to provide efficient means for harrowing and tilling the soil with a minimum expenditure of time and labor.

The invention includes a frame having supporting wheels, and means carried and operated thereby, for raking, digging, turning, and leveling the soil, cutting and pulverizing the hardened lumps, and cutting and shredding the weeds which may remain uncovered by the plow, all of which functions are performed in one operation, effecting a saving in time and labor, and thoroughly preparing the soil for the reception of seed, and all functions being performed without choking or clogging of the operative parts of the device, or unduly compacting the subsoil, and destroying all vestige of weeds and plants which may have accumulated upon the surface.

With these objects in view the invention presents a novel and useful construction, combination, and arrangement of parts as hereinafter described and claimed, and as illustrated in the drawings, it being understood that changes in form, size, proportion, and minor details, may be made without departing from the spirit of the invention or sacrificing any of its advantages.

Upon the annexed drawings, Figure 1 is a side elevation of my improved harrow and cultivator. Fig. 2 is a top plan view of the same. Fig. 3 is a detail view of the sliding clutch member which is adapted to connect the master wheels with the main shaft.

Referring now to the drawing for a more particular description, my combination implement is composed essentially of a main frame 21, carrying a lighter superstructure 22, on which is mounted the driver's seat 23. The frame is provided in front with the drawbars 24, to which tractor devices for horse or motor may be attached. At the front is mounted the foretruck wheels 25, and at the rear the truck wheel 26, all swivelly mounted for turning and for uneven ground, and all being vertically adjustable to support the frame in accordance with the work done.

Standards 20, projecting from frame 21, have journaled therein the main shaft 27, on which are mounted the independently rotatable master wheels 28, provided with integral clutch members 29. Sliding clutch members 30 transmit motion from the master wheel to the main shaft, each clutch member consisting of a rod 63 sliding concentrically within the main shaft, and annular members 64, 65, and 66, sliding on the main shaft, and connected by pins 67, with rod 63, whereby synchronous movement of the annular members is attained. Annular members 64 are provided with clutch elements 68 adapted to engage with clutch members 29. The clutch is normally maintained in operative position by springs 31 interposed between annular members 65 and fixed collars 32 on shaft 27. Either master wheel may be released for independent rotation, upon actuating a corresponding spring lever 33, connected by rod 34, with a corresponding shifting member 35, which slides in supporting member 36, and actuates a corresponding annular member 66, thereby shifting the clutch 30 to inoperative position.

A movable auxiliary frame 37 is mounted in the front end of the main frame, and has attached thereto a plurality of harrow teeth 38, which are formed to penetrate and break the soil as the device advances over the ground. Opposed guide members 39, on the main frame, support the auxiliary frame 37, and the heavy coiled springs 40, connected to the auxiliary frame and to braces 41, serve to maintain the auxiliary frame and the harrow teeth in a yielding position relative to the main frame.

The harrow teeth may clog or choke with weeds which were not covered thoroughly by the plow. To overcome this objection, I have provided a revolving spike-tooth harrow member 42, provided with radial cutting teeth 43. Harrow member 42 is mounted immediately in the rear of harrow member 37, and serves to cut and shred any weeds which may have accumulated on the teeth 38, and is also effectual to break clods and hardened lumps of soil. The harrow teeth 38 normally clear the revolving teeth 43, but, as undue resistance is offered by accumulating weeds or clods, the member 37 is forced rearward, allowing the teeth 43 to operate on the weed accumulations, as well as penetrating the soil beneath member 42. Springs 40 retract the member 37 when the weight is removed. The operator, by shifting either of levers 45, may veer the member 37 laterally, and the teeth 38 and 43, will serve mutually as scrapers, each for the other. As may be seen, the member 37 is independently movable relative to the main frame, and is automatically retracted to normal position. The member 42 is mounted to slide vertically in the main frame, being yieldingly maintained in normal position by springs 46, interposed between the sliding journal boxes 47, and standard braces 48.

Mounted at the rear of member 42, is a rotary pulverizer and clod crusher 49, provided with radial and inclined cutting blades 50, which are further adapted to break up and pulverize a lumpy soil. The direction of rotation of member 49 is contrary to the rotation of member 42, and therefore, all clods and lumps of soil not previously broken, and all weeds and trash accumulation not destroyed, are fed between the revolving teeth of members 42 and 49.

A transverse brace member 51, serves as a tray to receive any lumps, weeds, or clods, which may not have been pulverized, crushed, or otherwise prepared by the revolving cutters and crushers. The lumps and clods of soil will accumulate on member 51, as in a hopper, and are finally cut and ground to a fine mulch by a rotary cutter and roller 52, provided with spiral cutting blades 53.

Means for driving the rotary cutting and crushing members consist of a large spur gear wheel 54 on main shaft 27, and a pinion 58, on shaft 57 on which member 49 is mounted. The member 49 therefore rotates in a direction contrary to that of the master wheels. The member 42 is driven by the sprocket and chain connection 55. The rotary member 52 is driven by the sprocket and chain connections 56.

From the foregoing description, taken in connection with the drawings, it may be seen that I have provided a simple and efficient apparatus adapted for the thorough preparation of the soil for seed. With one operation, the soil is left in a smooth and pulverized condition, and seed thereafter planted will be properly covered, and plants grown therein may be thoroughly cultivated without injury and in an expeditious manner. Every particle of soil to the full depth to which the cutters and harrow teeth run, is thoroughly pulverized and stirred, and is not unduly compacted by the horse or motor tractor.

By the adjustable lever 59, connected to the spring tooth drag member by a link 60, the drag member may be set for depth of cut, or may be raised out of engagement with the ground by setting the lever 59 in the forward notch 61 in the segmental rack 62.

What is claimed is:

1. In a harrow, a rectangular frame, standards integral therewith, a main shaft journaled in the standards, master wheels driving the main shaft, rotary harrows mounted in the frame and transversely disposed relative thereto, spring means to retain the harrows in yielding relation to one another, teeth on said harrows, and driving means connecting the main shaft and harrows whereby opposed harrow teeth are rotated at different speeds and in opposite directions.

2. In a harrow, a main frame provided with integral and upwardly projecting standards, a main shaft journaled in said standards, master wheels mounted on the shaft and independently revoluble relative thereto, clutch means for connecting each master wheel operatively to the main shaft, a rotary spike-tooth harrow member mounted in the frame, a rotary pulverizing harrow mounted in the frame, radial and inclined teeth on the rotary pulverizing harrow, a sprocket and chain connection for driving the rotary toothed harrow from the main shaft, a gear wheel and pinion connection between the main shaft and pulverizing harrow, and driving the pulverizing harrow in a contrary direction, a transversely disposed brace member at the rear of the pulverizing harrow and serving as a hopper, and a rotary cutter at the rear of the hopper.

3. In a cultivating implement, a drag harrow, a revoluble spike-toothed harrow associated therewith, means for veering the drag harrow to coöperate with the revoluble harrow when clogged, and means to retract the drag harrow to normal position.

4. In a harrow, the combination with a frame, of master wheels to support the main frame, a secondary frame, a plurality of spring harrow teeth fixed to the secondary frame, rotary harrows mounted in the main frame and driven by the master wheels, a transversely extending member at the rear of the rotary harrows and serving as a hopper for clods escaping the spring harrow and rotary harrows, a revolving cutter having spiral blades and mounted at the rear of the hopper, and means for driving the cutter simultaneously with the rotary harrows.

5. The combination with a rectangular frame, of master wheels supporting the frame on each side, truck and caster wheels supporting the frame on the front and rear ends, a transverse truss beam disposed in the frame, shafts journaled in the frame, teeth attached to said shafts, a main shaft, connections between the main shaft and the first-named shafts, a rotary cutter at the rear of the truss beam, driving connections between the rotary cutter and the main shaft, and clutch means for connecting and disconnecting the master wheels to and from the main shaft.

6. A combined harrow, roller, and pulverizer, comprising a rectangular frame having side-bars and end-bars, caster and truck wheels supporting the end-bars, a standard projecting upward from each side-bar, a main shaft journaled in said standards, master wheels mounted on the main shaft and rotating independently thereof, clutch means for operatively connecting the master wheels with the main shaft, a secondary frame, harrow teeth on the secondary frame, guides on the main frame supporting the secondary frame and permitting a relatively backward and forward motion thereof, spring means normally maintaining the secondary frame in the forward position, rotary harrows journaled in the main frame, driving means connecting the rotary harrows and the main-shaft, and means for veering the secondary harrow frame laterally to engage the spring harrow teeth with the rotary harrows.

7. In a harrow and pulverizer, a rectangular frame, a main shaft journaled therein, wheels mounted on the main shaft and supporting the main frame, a rotary cutter including a shaft journaled in the main frame, spiral cutter blades surrounding the cutter shaft and spaced apart therefrom, driving means between the cutter shaft and main shaft, a transversely disposed truss beam in said main frame and immediately in advance of the rotary cutter and forming a clod hopper to retain the clods in proximity to the spiral blades, and rotary harrow means in advance of the truss beam.

8. The combination with a frame, of a shaft supported thereby, master wheels mounted on the shaft, clutch means for placing the master wheels in operative relation with the main shaft, rotary harrow shafts mounted in the main frame, cutting teeth on said rotary shafts and normally having interlapping paths of travel, spring means to maintain one harrow shaft in yielding relation with the other harrow shaft, and driving means between the main shaft and said rotary shafts whereby the cutting harrow teeth are rotated at different speeds and in opposite directions.

In testimony whereof I hereunto affix my signature.

HIYAKUMATSU IKE.

Copies of this patent may be obtained for five cents each, by addressing the "Commissioner of Patents, Washington, D. C."